Dec. 29, 1959 R. THERMET ET AL 2,919,296
METHOD OF OBTAINING TETRACHLORETHYLENE AND
TETRACHLORIDE OF CARBON
Filed March 15, 1957
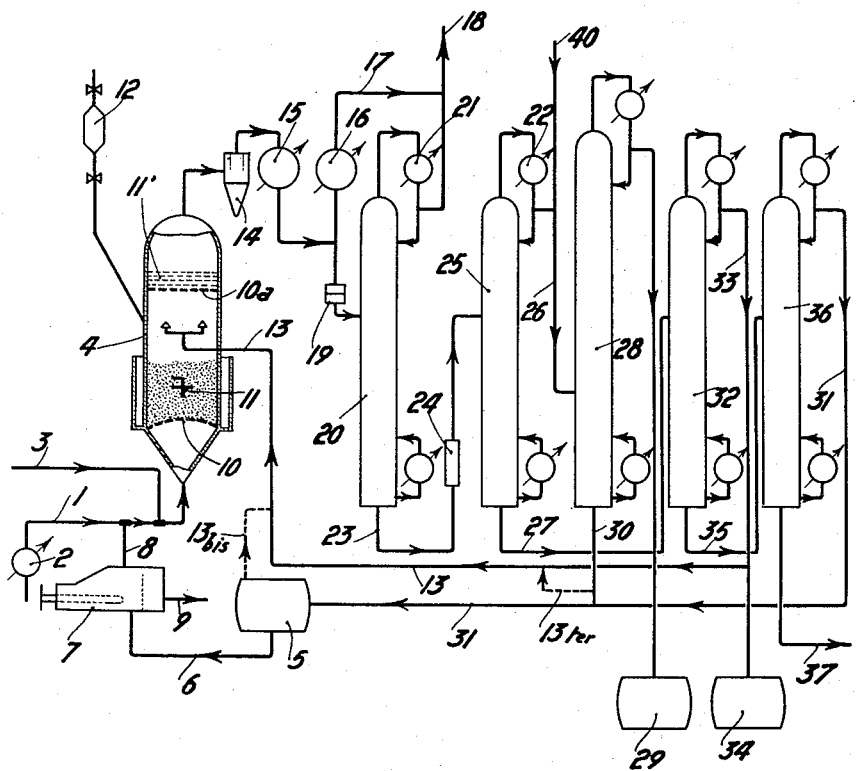

United States Patent Office 2,919,296
Patented Dec. 29, 1959

2,919,296

METHOD OF OBTAINING TETRACHLORETHYLENE AND TETRACHLORIDE OF CARBON

Robert Thermet, Grenoble, and Ludovic Parvi, Pont-de-Claix, France, assignors to Societe d'Electro-Chimie d'Electro-Metallurgie et des Acieries Electriques d'Ugine, Paris, France, a corporation of France Application March 15, 1957, Serial No. 646,434

Claims priority, application France April 17, 1956

6 Claims. (Cl. 260—654)

The present invention relates to a method of obtaining tetrachlorethylene and tetrachloride of carbon by the chlorination of propane and/or of propylene in the gaseous phase. In the description which follows, except where otherwise stated, the term "propane" is used to represent indifferently propane, propylene or their mixtures.

It is already known that the direct action of chlorine on propane enables tetrachlorethylene and tetrachloride of carbon to be obtained. At the same time as these two compounds, there are however formed a large number of undesirable chlorinated derivatives. Some of these derivatives (such as trichlorethylene) can be recycled, but they complicate the fractionating of the mixtures obtained. Others, such as for example hexachlorobenzene and hexachlorobutadiene, which are heavier than the desired compound, cannot be recycled and result in an increased consumption of raw materials. The presence of these undesired compounds may be explained to a major extent, by the violence and the exothermic nature of the reaction, which practically prevent all points of the reaction zone from being kept at the best temperature for the conduct of the reaction. In order to try to avoid these difficulties, the reactive gases have been diluted, but in order to obtain a substantial improvement, it is then necessary to use a large quantity of dilution gas and this complicates the problems of separation. These unfavorable conditions have led to the continuance of researches with a view to obtaining a predetermined result such as that proposed above, during the chlorination of propane.

In a more general manner, it is known that a large number of chemical reactions, in particular reactions in the gaseous phase, can be carried out under good conditions by the use of fluid beds.

Taking account of these various teachings, the applicants have directed their researches to the study of the chlorination of propane as a function of the nature of the chlorinating gas. They have been able to confirm that hexachlorethane readily gives up chlorine to a little or non-chlorinated derivative such as propane, with the absorption of heat, and that conversely hexachlorethane is itself also readily produced from tetrachloroethylene and chlorine, present in a gaseous mixture. The applicants have shown that the mixture of hexachloroethane with chlorine enables the exothermic nature of the reaction of chlorination of propane to be limited, and it has been found that its reconstitution at the expense of tetrachlorethylene and of chlorine at the end of the reaction permits of the elimination of a possible excess of this latter.

Within the scope of these studies, research has enabled a method of simultaneous manufacture of tetrachlorethylene and tetrachloride of carbon by chlorination of propane to be perfected, by using chlorine and a diluent gas, the said method consisting essentially: in that the propane, chlorine, hexachlorethane are mixed with a small proportion, with respect to the chlorine and the propane, of a diluent chosen from the group consisting of tetrachlorethylene, tetrachloride of carbon and their mixtures, the quantity of chlorine being maintained very little greater than or even equal to that consumed during the complete conversion of propane to tetrachlorethylene and tetrachloride of carbon, and the quantity of diluent is chosen to be at least equal to that which prevents the mixture from being explosive and at most equal to that which corresponds to an adiabatic evolution of the reaction, in that the said mixture is passed through a fluid bed provided in the reaction zone and held at a temperature comprised between about 485° C. and 520° C., in that the gases passing out of the reaction zone are cooled, in that from the said cooled gases there is separated out, on the one hand hydrochloric acid, tetrachlorethylene, and carbon tetrachloride which are produced, and the by-products which are not usable in the cycle, and on the other hand hexachlorethane, the diluent and intermediate compounds which cannot be recycled, and in that fresh quantities of chlorine and propane equal to those consumed are incorporated in the recycled gases.

The fluid bed is formed from a bed of solid granular material suitably fluidized by the passage of the gaseous mixture; the size of the particles varies slightly with the nature and the physical state, and thus the apparent density of the solid material: it should also be fairly small in order that the flow of gases used can maintain the material in the fluid state without however the particles being carried away to any abnormal extent out of the reaction zone by the action of the flow of gas. As a solid material, there can be employed one or a number of materials, or a mixture of materials capable of applying to varying degrees a catalytic action on the gaseous mixture employed. It is, for example, possible to use in the composition of the fluid bed, sand, fuller's earth, pumice, kieselguhr, active carbon and diatomaceous earth, and also more or less finely-divided metals.

Such materials may or may not be coated or impregnated with substances having a catalytic effect, for example chlorides of copper, barium, cobalt, nickel and cerium.

In the mixture of gases introduced into the reaction zone, there is preferably employed a quantity of hexachlorethane which does not exceed 10% of the quantity of chlorine present.

In determining the nature of the solid material used, the speed of the passage of the gases, the form and the possible cooling of the equipment, action is made on the exchanges of heat which take place in the process and on the temperature observed. The choice is made so as to ensure that in the reaction zone the temperature is comprised between 485° and 520° C. which is suitable for the production of the relative quantities of tetrachlorethylene and carbon tetrachloride which are desired. It has been found that an increase in temperature facilitates the formation of tetrachloride of carbon. In this choice, account must be taken of the fact that below 485° C. the reaction would give, in addition to the desired compounds, a substantial proportion of chloropropane, and above 520° C. a much higher proportion of by-products which cannot be recycled.

If so desired, it is possible to eliminate in an almost complete manner, the free chlorine in the gases which are to be separated; in fact, the presence of hexachlorethane in the gaseous reaction mixture reduces the amount of the thermal exchanges and increases the quantity of chlorine available in the reaction zone. There is found an excess of available chlorine in the reaction zone, even when a quantity of chlorine is used which is very little greater than that required to convert the propane to tetrachlorethylene and tetrachloride of carbon. In general, at their exit from the fluid reaction zone, the gases contain a little free chlorine (5% for example) and the non-decomposed part of the initial hexachlorethane. When it is admissible to lose this chlorine, or when it is used in a further process, there can be admitted at the intake of the apparatus, in addition to the quantity absorbed by the propane, a quantity of chlorine corresponding to that which is eliminated in this way. But the reuse of this chlorine, which necessitates in most cases the separation from hydrochloric acid, presents a large number of technical problems of production and of use.

In order to avoid the necessity of having to solve these problems, it is possible in accordance with a preferred embodiment of the present invention, to use a quantity of chlorine which corresponds practically to that absorbed by the propane, and to absorb, after the outlet of the fluid reaction zone and after cooling, the free chlorine then contained in the gases by passing the latter into an apparatus (constituted for example by a fixed bed of catalytic materials kept at a suitable temperature and incorporated or not with the reactor) serving to add this free chlorine to a corresponding quantity of tetrachlorethylene. The hexachlorethane thus formed is formed is recycled and is again present in the gases brought into the reaction zone.

When it is desired to obtain hexachlorethane at the same time as tetrachloride of carbon and tetrachlorethylene, an excess of chlorine is admitted to the reactor and the gases passing out of the said reactor are led into a zone in which chlorine in excess is combined with a part of the tetrachlorethylene previously formed. There is thus produced a quantity of hexachlorethane greater than that which had been introduced into the reactor. The apparatus ultimately used to isolate the products formed by the reaction is naturally slightly modified in this case.

These latter possibilities are very simply explained by the reversible reaction:

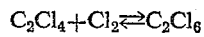

$$C_2Cl_4 + Cl_2 \rightleftarrows C_2Cl_6$$

The equilibrium is displaced towards the left in the fluid reaction zone, and the propane to be chlorinated is thus in the presence of an available excess of chlorine; then after leaving the reaction zone, the equilibrium is displaced towards the right in order to ensure the disappearance of the free chlorine present and the initial hexachlorethane is reconstituted at the same time; finally, it would appear that only the chlorine has been used, although an excess of chlorine extremely favorable to the limitation of by-products is ensured in the reaction zone.

In order to vary the relative proportions of tetrachloride of carbon and tetrachlorethylene obtained, the nature of the diluent gas can be varied. When the diluent employed is tetrachlorethylene, there is obtained a molar proportion of tetrachloride of carbon and of tetrachlorethylene in the vicinity of unity, although this is somewhat variable as a function of the other conditions of the reaction, and of the temperature in particular. If a mixture of tetrachlorethylene and tetrachloride of carbon is used as a diluent, the proportion of tetrachlorethylene formed can be increased until this compound alone is obtained when tetrachloride of carbon alone is used as the diluent. This can readily be explained by considering the law of mass action applied to the equilibrium

$$C_2Cl_4 + 2Cl_2 \rightleftarrows 2CCl_4$$

It will be noted that the method in accordance with the present invention enables the use of only small proportions of diluent with respect to the chlorine or the propane used. This reduction is essentially obtained by means of the use of a fluid bed and to a certain extent, of a chlorinating gas which is less exothermic than pure chlorine.

This is due to the fact that the solid bed, kept in a fluid state by the gaseous mixture which passes through it, enables a great uniformity of temperature to be obtained, which reduces the formation of by-products and increases the efficiency of the reaction materials. The high coefficients of transmission of heat between the fluidized solid and either the fluidizing mixture of gases or the metallic parts of the apparatus, facilitate the adjustment of the temperature of the reaction by accelerating the increase or the decrease, when the selected value is departed from, of the quantities of heat exchanged with the exterior. This stability of temperature is extremely favorable to the small proportion of the quantities of by-products which are obtained in substantial quantities in the known processes. In accordance with the present method, it is possible to reduce by nearly 0.5% the quantity of initial chlorine lost in these undesirable products.

The apparatus employed for carrying the above method into effect is preferably constituted by a long cylindrical apparatus of which one part only is occupied by the solid material when this is brought into the fluid state. This latter precaution makes it possible to avoid excessive carrying away of the solid material out of the reaction apparatus.

The isolating operations, which are known per se, may be carried out in the usual type of apparatus. The cooling of the gases may be effected in apparatus of the trickle type or by heat exchange through the walls; the hydrochloric acid may be absorbed in water by contact absorption or by washing; the organic products may be separated from each other by condensation or by fractional distillation.

The recyled gases are preferably freed by any known method from the heavy impurities which they may have carried away with them.

The gases thus continuously recycled are employed, as has already been explained, to reform the gaseous mixture which is introduced into the reaction zone.

It should be emphasised that amongst other advantages of the invention, the present process enables chlorine and propane to be used in practically stoichiometric quantities, and to use only a small quantity of diluent, gives only a small proportion of non-recyclable by-products, ensures an almost total absence of tars and, if this is desired, an absence of residual chlorine in the exit gases.

The invention is explained in more detail in the description which follows of an example of application of the process which forms the object of the invention, reference being made to the accompanying diagrammatic drawing. The apparatus has been employed for the manufacture of tetrachlorethylene and tetrachloride of carbon from chlorine and propane.

The apparatus is supplied with chlorine through a supply piping system 1, with a heat exchanger 2, and with propane through a piping system 3; the pipes 1 and 3 deliver into the lower portion of a reaction chamber 4. A reservoir 5 which receives the recycled liquids passes them through the medium of a pipe 6 into an evaporator 7, and then through a pipe 8 into the piping system 1. The evaporator 7 is provided with a drainage pipe 9 located at its lower portion and intended to evacuate from time to time, in practice at the end of several months of operation, the heavy products such as tars which are formed in very small quantities in the evaporator.

The reaction chamber 4 comprises an empty zone above a grid 10 which carries the solid mass 11 to be fluidised; in the example, an apparatus of 80 cm. in diameter was used, the solid material having a thickness of 90 cm. after fluidization. With the solid material used (active carbon impregnated with cupric chloride and barium chloride) in the present example, the increase in volume due to the passage of gas is only about 10%. The chamber 4 comprises a second grid 10a carrying a thin fixed layer of a catalyst 11′, a container 12 enabling the losses of fluid mass due to carrying-away out of the chamber to be made up as may be required; a pipe 13 enables a vaporisable liquid to be mixed with the gases passing out of the reaction zone, the vaporisation of which cools the gases; the said liquid is derived from another portion of the installation.

When they pass out of the reaction chamber, the gases pass into a cyclone 14 which serves to free them from the larger particles of dust carried away, and then into water coolers 15 and brine coolers 16, in which the condensable organic products are separated from the hydrochloric acid; these products pass out at 17 and again at 18. The condensed liquids pass through the filter 19 which retains the fine solid particles which have been carried off, and are then passed into the rectifying column 20 which is intended to eliminate the chlorine and the dissolved hydrochloric acid. By means of a brine condenser 21, the condensable portions are brought back to the head of the column 20. The separated chlorine and hydrochloric acid rejoin at 18 the gases passing through the pipe 17 from the condenser 16. This mixture of gases is then treated in apparatus (not shown), which enables the hydrochloric acid to be dissolved and to bring back into the circuit, through 40 for example, the chlorinated derivatives which they may contain.

The liquid flowing down at 23 to the base of the column 20 passes through an activated alumina column 24 intended to ensure as complete a drying as possible of the products; this liquid then supplies the column 25. This column separates the carbon tetrachloride and the trichlorethylene (escaping at the head through 26 with a fraction of the tetrachlorethylene) from the heavier compounds (tetrachlorethylene, hexachlorethane, hexachlorobutadiene, hexachlorobenzene) which pass out as liquids at 27 at the foot of the column. The liquid passing out through 26 is brought into the column 28 which separates the tetrachloride of carbon at the head, this being then stored in the reservoir 29, and at the foot, the trichloroethylene and the tetrachlorethylene contained in the mixture, these being brought through 30 and 31 to the reservoir 5 for the recycled products.

The liquid passing out at 27 from the column 25 is brought into the column 32 in which is separated, on the one hand at the head, tetrachlorethylene (led through 33, partly to the storage reservoir 34 and partly through 13 to the reactor 4), and on the other hand, at the foot, a mixture of tetrachlorethylene, hexachlorethane, hexachlorobutadiene, and hexachlorobenzene. The liquid is sent through the pipe 35 to the column 36 which separates at the foot the non-recyclable products (eliminated through 37 by being drawn off continuously or intermittently) and at the head a mixture formed essentially of tetrachlorethylene and hexachlorethane, which is brought back through the pipe 31 to the reservoir 5.

In order to avoid waste of power, the temperature of the column 36 can be limited and a slight loss of hexachlorethane results, this being then carried away through 37 with the products which cannot be recycled. Also, with the object of reducing the size of the said column 36, its height can be reduced with the consequent tolerance of the recycling of a substantial part of the hexachlorobutadiene; a partial recycling of this kind does not adversely affect the satisfactory working of the method.

Pipes 13bis and 13ter provided with regulating valves, permit of the addition to the tetrachlorethylene brought back through 13 between the two solid layers of the reactor, either liquid obtained from the reservoir 5 or a portion of the mixture of trichloroethylene and tetrachlorethylene passing out from the foot of the column 28.

A test was carried out over a long period with the apparatus described above, the reaction chamber 4 of which contained at 11 active carbon impregnated with a solution of cupric chloride and barium chloride, then dried under vacuum for 24 hours at 180° C.; the granular size of the active carbon employed corresponds to the mesh AFNOR 28/32. The fixed layer 11' is formed of a layer of 20 cm. in thickness, of sticks of 3 to 6 mm. in size, formed of active carbon impregnated with cupric chloride and barium chloride.

The following quantities were employed and introduced into the reaction chamber:

| | Kgs. per hour |
|---|---|
| At 8: | |
| Tetrachlorethylene | 350 |
| Carbon tetrachloride | 2 |
| Hexachlorethane | 53.8 |
| Trichlorethylene | 6 |
| Hexachlorobutadiene | 1 |
| At 1: Gaseous chlorine | 335 |
| At 3: Commercial propane (at 50% by volume, approx., of propylene) | 26.46 |
| At 13: Tetrachlorethylene | 70 |

In the mixture which passes through the fluid mass 11, the tetrachlorethylene and the chlorine are thus in the molecular proportion of about 3.5.

The temperature of the fluid mass 11 was 500° C. It was found that there was nowhere a difference greater than 2° C. between the various points of the fluid mass. The temperature was regulated by acting on the flow of the diluent introduced at 8, for example by controlling the heat of the evaporator 7 in dependence on the reaction temperature. The absolute pressure in the reactor was 920 mm. The speed of passage of the gas into the reactor was about 22 cm. per sec., calculated by assuming the reactor to be empty at the temperature and pressure of operation.

The fixed layer 11' received gases cooled by the atomisation and volatilisation of the liquid introduced at 13 and was thus brought down to about 400° C.

The gases passing out from the top of the reactor towards the cyclone 14 had the following composition:

| | Kgs. per hour |
|---|---|
| Tetrachlorethylene | 510 |
| Tetrachloride of carbon | 112 |
| Hexachlorethane | 54.8 |
| Trichlorethylene | 6.05 |
| Hexachlorobutadiene | 2 |
| Hexachlorobenzene | 1 |
| Hydrochloric acid | 157.05 |
| Chlorine | 1.36 |

It can be seen that when producing 90 kgs. per hour of tetrachlorethylene and 110 kgs. per hour of tetrachloride of carbon, only 1 kg. per hour of hexachlorethane was formed as a by-product, with 0.05 kg. per hour of trichlorethylene, 1 kg. per hour of hexachlorobutadiene and 1 kg. per hour of hexachlorobenzene, and that 99.6% of the chlorine introduced was absorbed.

The cyclone 14 retained the solid particles having sizes greater than $5\mu$, and the filter 19 kept back the solid particles of smaller sizes.

The solid material added from the container 12 had a granular size which was slightly finer (mesh 26/30 for example) than the initial material in order to take account of an increase in weight of the fluid mass during the course of use.

The gases escaping at 18 had the following composition:

| | Kgs. per hour |
|---|---|
| Hydrochloric acid | 157.05 |
| Chlorine | 1.36 |
| Tetrachloride of carbon | 0.60 |
| Perchlorethylene | 0.35 |
| Trichlorethylene | 0.05 |

At the head of the column 25, there was separated:

| | Kgs. per hour |
|---|---|
| Tetrachloride of carbon | 111.4 |
| Trichlorethylene | 6.0 |
| Tetrachlorethylene | 23.0 |

In the column 28, there were separated:

At the head: 109.4 kgs. per hour of tetrachloride of carbon which were sent to the storage tank 27;

At the foot: 2.00 kgs. per hour of tetrachloride of carbon; 6.00 kgs. per hour of trichlorethylene; and 23.00 kgs. per hour of tetrachlorethylene, which were recycled to the reservoir 5.

In the column 32, there were separated:

At the head: 15.65 kgs. per hour of tetrachlorethylene, of which 89.65 were sent to the storage tank 30 and 70 kgs. per hour to the reactor through the pipe 13.

At the foot: a liquid composed of:

| | Kgs. per hour |
|---|---|
| Tetrachlorethylene | 327 |
| Hexachlorethane | 54.8 |
| Hexachlorobutadiene | 2.0 |
| Hexachlorobenzene | 1.0 |

By separation of this latter mixture, the column 36 gave the following:

At the head:

| | Kgs. per hour |
|---|---|
| Tetrachlorethylene | 327 |
| Hexachlorethane | 53.8 |
| Hexachlorobutadiene | 1.0 | which were recycled to the reservoir 5;

At the foot:

| | Kg. per hour |
|---|---|
| Hexachlorethane | 1 |
| Hexachlorobutadiene | 1 |
| Hexachlorobenzene | 1 |

It can readily be seen that having introduced into the cycle 335 kgs. per hour of chlorine and 26.46 kgs. per hour of commercial propane at about 50% by volume of propylene, there has thus been produced:

109.4 kgs. per hour of tetrachloride of carbon
89.65 kgs. per hour of tetrachlorethylene
157.05 kgs. per hour of hydrochloric acid; whilst losing only:
1.36 kgs. per hour of chlorine;
1.0 kgs. per hour of hexachlorobutadiene;
1.0 kgs. per hour of hexachlorobenzene;
1.0 kgs. per hour of hexachlorethane.

What we claim is:

1. A method of simultaneous manufacture of tetrachlorethylene and carbon tetrachloride in the gaseous phase, which comprises passing through a fluidized bed of granular material in a reaction zone maintained at a temperature between about 485° C. and 520° C. in a reaction chamber, a gaseous mixture of chlorine, propane, hexachlorethane and a diluent, said diluent being selected from the group consisting of tetrachlorethylene, carbon tetrachloride and mixtures thereof, the quantity of said diluent being at least equal to that which prevents the mixture from being explosive and at most equal to that which corresponds to an adiabatic evolution of the reaction, thereby converting propane into tetrachlorethylene and carbon tetrachloride with the liberation of heat and converting hexachlorethane into tetrachlorethylene and free chlorine with the absorption of heat, cooling the gases issuing from said reaction zone and passing the cooled gases through a static bed of catalytic substances to combine free chlorine with tetrachlorethylene so as to reform hexachlorethane, cooling the gases passing out of said static bed, separating out the hydrochloric acid from the cooled gases, separating out the recyclable intermediate compounds and recycling them, removing a part of the desired product, separating the non-recyclable byproducts, recycling the residue comprising the hexachlorethane and the remaining part of the tetrachlorethylene and carbon tetrachloride not removed as product, and adding to the recycling gases fresh quantities of chlorine and propane equal to the quantities of chlorine and propane consumed.

2. A method according to claim 1, in which the static bed of catalytic substances is disposed in the interior of the upper portion of the reaction chamber.

3. A method according to claim 1, in which the chlorine in the gaseous mixture fed to said fluidized bed of granular material is substantially equal to the quantity theoretically required to convert the propane into tetrachlorethylene and carbon tetrachloride.

4. A method according to claim 1, wherein the gases issuing from said reaction zone are cooled to about 400° C. prior to passing them through said static bed of catalytic substances.

5. A method according to claim 1, wherein the gases issuing from said reaction zone are cooled by injection into them of tetrachlorethylene in the liquid state, prior to passing them through said static bed of catalytic substances.

6. A method according to claim 1, wherein the molecular ratio of chlorine to hexachlorethane in the gaseous mixture fed to said fluidized bed of granular material is between 1:0.03 and 1:0.1.

References Cited in the file of this patent

UNITED STATES PATENTS

| 2,442,324 | Heitz et al. | May 25, 1948 |
| 2,538,723 | Fruhwirth et al. | Jan. 16, 1951 |
| 2,676,998 | Kuntz et al. | Apr. 27, 1954 |

FOREIGN PATENTS

| 849,084 | France | Nov. 14, 1939 |
| 673,565 | Great Britain | June 11, 1952 |
| 779,565 | Great Britain | July 24, 1957 |

OTHER REFERENCES

Jones et al.: "Chlorination of Natural Gas," Bureau of Mines Tech. Paper 255 (1921), pp. 21–25.

UNITED STATES PATENT OFFICE

CERTIFICATE OF CORRECTION

Patent No. 2,919,296                           December 29, 1959

Robert Thermet et al.

It is hereby certified that error appears in the printed specification of the above numbered patent requiring correction and that the said Letters Patent should read as corrected below.

Column 1, lines 59 and 60, for "hexachloroethane" read -- hexachlorethane --; column 3, lines 23 and 24, strike out "is formed"; line 32, after "greater" strike out the period; column 5, line 67, for "trichloroethylene" read -- trichlorethylene --; column 7, line 10, for "15.65 kgs." read -- 159.65 kgs. --.

Signed and sealed this 12th day of July 1960.

(SEAL)

Attest:

KARL H. AXLINE
Attesting Officer

ROBERT C. WATSON
Commissioner of Patents